United States Patent Office 3,838,058
Patented Sept. 24, 1974

3,838,058
STABILIZATION OF PERCHLOROETHYLENE
Norman L. Beckers, Chardon, Ohio, assignor to Diamond Shamrock Corporation, Cleveland, Ohio
No Drawing. Filed Nov. 17, 1972, Ser. No. 307,643
Int. Cl. B08b 5/00; C07c 17/40; C23g 5/02
U.S. Cl. 252—171                    10 Claims

ABSTRACT OF THE DISCLOSURE

Addition of one of the following chemical components to the stabilizer system used in perchloroethylene for vapor phase degreasing improves its stability:
(1) epibromohydrin
(2) epibromohydrin and allyl glycidyl ether
(3) epibromohydrin and N-ethyl morpholine
(4) epibromohydrin, allyl glycidyl ether and N-ethyl morpholine
(5) N-ethyl morpholine
(6) N-ethyl morpholine and allyl glycidyl ether.

BACKGROUND OF THE INVENTION

Perchloroethylene is one of most widely used industrial solvents. It is used extensively as a degreasing solvent, particularly in vapor phase degreasing where the article to be cleaned is suspended above the surface of the perchloroethylene which is being vaporized and the suspended article is cleaned by condensation of perchloroethylene vapors on its surface. Perchloroethylene tends to be decomposed by oxygen, heat, light, metal salts and other contaminants present during its use and storage in vapor degreasing operations. Decomposition of perchloroethylene is particularly undesirable as not only are its desirable properties adversely affected but its useful life as a solvent is limited.

It is well known that decomposition of perchloroethylene can be minimized or prevented by the addition of small but effective quantities of chemical components to the perchloroethylene which act as stabilizers and prevent substantial decomposition from occurring. These components are often combinations of two or more different types of chemical compounds and are known as stabilizer systems. For example, a combination of epichlorohydrin and N-methyl morpholine has been used to stabilize perchloroethylene against decomposition in vapor degreasing. Although this combination is effective in specific applications, the search for more effective perchloroethylene stabilizer systems continues.

STATEMENT OF THE INVENTION

Addition of one of the following chemical components to the stabilizer system used in perchloroethylene for vapor phase degreasing improves stability of the solvent and reduces the tendency of the solvent to decompose during use:
(1) epibromohydrin
(2) epibromohydrin and allyl glycidyl ether
(3) epibromohydrin and N-ethyl morpholine
(4) epibromohydrin, allyl glycidyl ether and N-ethyl morpholine
(5) N-ethyl morpholine
(6) N-ethyl morpholine and allyl glycidyl ether.

Perchloroethylene stabilized with a stabilizer system containing an effective amount of epibromohydrin or epibromohydrin and allyl glycidyl ether retains satisfactory acid acceptance after substantial amounts of perchloroethylene have been lost during vapor phase degreasing operations. Stabilization of perchloroethylene with a stabilizer system containing an effective amount of N-ethyl morpholine reduces any acidity that may be formed in the stabilized solvent after loss of substantial amounts of perchloroethylene by evaporation during vapor phase degreasing. Epibromohydrin and allyl glycidyl ether may be used alone or in conjunction with N-ethyl morpholine in perchloroethylene stabilizer systems. Likewise N-ethyl morpholine may be used alone or in combination with epibromohydrin and allyl glycidyl ether or allyl glycidyl ether or epibromohydrin in perchloroethylene stabilizer systems.

DESCRIPTION OF THE PREFERRED EMBODIMENTS

The quantity of one of the following chemical components added to a stabilizer system in the practice of this invention will vary depending on the nature and quantity of other stabilizers in the stabilizer system used as well as other practical considerations:
(1) epibromohydrin
(2) epibromohydrin and allyl glycidyl ether
(3) epibromohydrin and N-ethyl morpholine
(4) epibromohydrin, allyl glycidyl ether and N-ethyl morpholine
(5) N-ethyl morpholine
(6) N-ethyl morpholine and allyl glycidyl ether.

The quantity of the chemical component used in this invention is "an effective amount" or "a stabilizing amount." This quantity used may be within the range of from about 0.001 to about 2 percent and preferably from about 0.01 to about 0.5 percent by weight based on the solvent. Even though higher concentrations of these chemical components may not be harmful, higher concentrations increase costs and can seldom be justified.

Since perchloroethylene is very susceptible to decomposition and is easily decomposed by a variety of agents over a wide range of conditions, it may be desirable to use the above mentioned components in systems containing other stabilizers or co-stabilizers. The other stabilizers either provide different types of stabilization or enhance the stabilizing action of the above mentioned components.

One class of stabilizers, which may be incorporated into perchloroethylene stabilizer systems containing one of the above mentioned components, are aliphatic and aromatic amines such as diethylamine, triethylamine, dipropylamine, diisopropylamine, diethanolamine, morpholine, N-methylmorpholine, pyridine and aniline. Other nitrogen-containing materials such as pyrroles, e.g., methylpyrrole and nitroalkanes, e.g., nitromethane and nitropropane may also be used.

Certain organic oxygen-containing compounds are also useful. Organic epoxides such as ethylene oxide, propylene oxide, butylene oxide, epichlorohydrin, glycidol, cyclohexene oxide and styrene oxide may be used. Certain cyclic ethers such as tetrahydropyran, dioxane, dioxolane, trioxane and tetrahydrofuran are useful.

Another useful class of stabilizers are aromatic compounds containing a phenol group such as phenol, butylphenol, thymol, catechol, isoeugenol and other organic phenols having a low boiling point.

Also useful are a number of miscellaneous organic compounds such as esters, e.g., ethyl acetate; alcohols, e.g., amyl alcohol and methyl butynol, and ketones, e.g., methyl ethyl ketone.

Perchloroethylene stabilized with stabilizer systems containing epibromohydrin, N-ethyl morpholine or mixtures of these compounds with allyl glycidyl ether is particularly useful as a solvent in vapor degreasing, that is, the cleaning process where the hot vapors of a chlorinated solvent are used to remove soils such as oils, greases and waxes from metal parts.

A vapor degreasing unit consists of an open steel tank with a heated solvent reservoir or sump at the bottom and a cooling zone near the top of the tank. Sufficient heat is introduced into the sump to boil the solvent and to generate hot solvent vapor. Because the hot solvent vapor is heavier than air, it displaces the air and fills the tank up to the cooling zone. The hot vapor condenses when it reaches the cooling zone, thus maintaining fixed vapor level and creating a thermal balance. A cool metal part or workpiece to be cleaned is lowered into the hot vapor where the relative coolness of the workpiece causes the solvent to condense on its surface. The condensate dissolves the soil and removes it from the surface by dripping back into the boiling solvent in the sump. When the workpiece reaches the temperature of the hot vapor, condensation and cleaning cease. Workpieces are dry when removed from the tank.

Perchloroethylene has numerous advantages in vapor degreasing. Its higher operating temperature provide complete drying of the work by vaporizing entrapped moisture. It reduces staining of light-gage metals that attain vapor temperatures too rapidly in lower boiling solvents before sufficient condensation has occurred to perform satisfactory cleaning. Perchloroethylene condensate is retained on the workpiece for a longer period of time. It provides a more thorough removal of high-melting waxes.

One of the disadvantages of perchloroethylene as a solvent in vapor degreasing is that appreciable quantities of the solvent and the stabilizer present in the solvent are lost by evaporation during use. Disproportionate amounts of individual stabilizers present in the system are lost during evaporation so that the stabilizer system no longer provides satisfactory protection. Stability of perchloroethylene containing effective amounts of the above mentioned components in the stabilizer system is not adversely affected even after considerable evaporation has occurred.

For a fuller understanding of the nature and objects of this invention, reference may be made to the following examples. These examples are given merely to illustrate the invention and are not to be construed in a limiting sense. All quantities, proportions and percentages are by weight and all references to temperatures are °C. unless otherwise indicated.

EXAMPLE 1

Perchloroethylene samples containing the various stabilizer systems described below are prepared and evaluated in a "minidegreaser."

The minidegreaser simulates a commercial vapor phase degreaser. It is a cylindrical nickel pot 8 3/16" diameter x 12" high equipped with 3½ turns of ¼" stainless steel tubing positioned inside and 4" from the top of the pot which functions as a cooling coil. The outside wall of the pot is insulated with 1½" fiber glass and is heated on a hot plate inside a fume hood. At the beginning of the test, the pot is filled to a depth of 4" with a liquid perchloroethylene sample (3,400 ml.) which provides a 4" solvent vapor zone above the surface of the liquid and a 4" air space above the solvent vapor zone. There are about 3" of freeboard in the air space above the cooling coil. Samples taken from the boiling liquid in the sump are referred to as "Boiling Sump Samples."

The required amount of the liquid perchloroethylene sample is added to the pot and heated to boiling. A Boiling Sump Sample is taken before any evaporation occurs and after 25% evaporation and analyzed to determine how much of the acid acceptor (epoxide) has been lost during evaporation of 25% of the solvent. Results of these analyses are reported in Table I under the heading Acid Acceptance as percent NaOH, which can be determined by adding a known amount of anhydrous alcoholic HCl to the sample, back titrating to a bromophenol blue end point with standardized dilute caustic soda and calculating as percent NaOH.

Perchloroethylene samples are stabilized with the stabilizer systems shown in Table I by using 75 p.p.m. of N-methyl morpholine, 5 p.p.m. of p-tertiary amylphenol and the indicated quantity of epoxide or epoxides. Each sample is evaluated in the minidegreaser by boiling until 25% of the solvent has evaporated and then determining the Acid Acceptance as percent NaOH.

Results of the tests in the minidegreaser with these samples are given in Table I. These results show that Sample 1, which contains epichlorohydrin as an acid acceptor and represents the prior art, loses about 84% of its acid acceptance after 25% of the sample is evaporated. Sample 2, which contains an equimolar quantity of epibromohydrin and is within the scope of this invention, loses about 25% of its acid acceptance after 25% of the sample is evaporated. Sample 3, which contains an equimolar quantity of a mixture of epibromohydrin and allyl glycidyl ether and is within the scope of this invention loses about 37% of its acid acceptance. Sample 4, which contains an equimolar quantity of a mixture of epichlorohydrin and allyl glycidyl ether and represents the prior art, loses about 48% of its acid acceptance.

EXAMPLE 2

Two perchloroethylene samples are prepared and evaluated using the minidegreaser test procedure described in Example 1 with the exception that 26.5% of Sample 5 and 28.4% of Sample 6 are evaporated.

Both of these samples are also evaluated in the "48 hour stability test." This test involves charging 100 ml. of the sample and 0.2 ml. of distilled water into a flask equipped with a Soxhlet extractor and condenser. Three 0.003 gauge steel strips (2.0 x 7.5 cm.) are placed at three locations in the apparatus: the first strip is placed in the solvent in the flask; the second strip placed in the Soxhlet extractor and the third strip inserted in the lower end of the condenser. A 6 watt fluorescent (black light) bulb is placed one inch from the vapor tube on each Soxhlet extractor. Heat is then applied at a rate sufficient to cause each Soxhlet extractor to siphon every 8 to 10 minutes. Refluxing is continued for 48 hours. At the end of 48 hours, the samples are allowed to cool. The three strips are then removed, cleaned to remove corrosion and weighed to determine amount of corrosion caused by exposure of steel to the solvent sample. The amount of corrosion is expressed as weight loss and is shown in Table II as "mg. loss." This value is a measure of the corrosivity of the stabilized solvent as well as its decomposition products. Acidity of each solvent sample after the test is determined by shaking a volume of the perchloroethylene sample with an equal volume of neutral distilled water, separating the resulting aqueous phase and titrating to a bromthymol blue end point with standardized dilute caustic soda, and reporting the result in Table II as "Acid as percent HCl."

Compositions of Samples 5 and 6 are shown in Table II. It will be noted that Sample 5 is based on the prior art and that Sample 6 is within the scope of this invention. Results in the Table II show that Sample 5 loses 92% of its acid acceptance after 26.5% of the solvent has been evaporated in the minidegreaser test while Sample 6 loses about 28% of its acid acceptance after 28.4% of the solvent has been evaporated. The results in Table II also show that Sample 6 is 2.5 times less corrosive than Sample 5 and produces 96% less HCl in the 48 hour stability test.

EXAMPLE 3

Perchloroethylene Sample 7, which contains the stabilizer system shown in Table III, is prepared. This sample differs from the prior art in that it contains epibromohydrin, allyl glycidyl ether and N-ethyl morpholine in the stabilizer system. Evaluation of the sample using the minidegreaser test procedure described in Example 1 shows that the sample loses 58% of its acid acceptance after 25.9% of the sample has been evaporated.

bromohydrin and (2) epibromohydrin and allyl glycidyl ether.

References Cited

UNITED STATES PATENTS

| | | | |
|---|---|---|---|
| 2,364,588 | 12/1944 | Morris et al. | 260—652.5 R |
| 2,904,600 | 9/1959 | Copelin | 260—652.5 R |
| 3,260,760 | 7/1966 | Domen et al. | 260—652.5 R |
| 3,031,410 | 4/1962 | Petering et al. | 260—652.5 R |
| 2,721,883 | 10/1955 | Stevens | 260—652.5 R |

FOREIGN PATENTS 418,230  10/1934  Great Britain ____ 260—652.5 R

MORRIS O. WOLK, Primary Examiner

A. TURK, Assistant Examiner

U.S. Cl. X.R.

134—31; 252—392, 396; 260—652.5 R

Sample 7 is also evaluated in the "72 hour stability test" which only differs from the "48 hour stability test" described in Example 2 in that the test requires 72 instead of 48 hours. A 63 mg. metal loss occurs in 72 hour stability test and the solvent sample has alkalinity of 0.0024% as NaOH after the test. Addition of N-ethyl morpholine eliminates the acidity obtained after evaporation test and after the stability test. About 15 p.p.m. of N-methyl morpholine, 67 p.p.m. of p-tertiary amylphenol and 119 p.p.m. of N-ethyl morpholine remain in the sample after 25.9% of the sample has been evaporated.

It is to be understood that although this invention has been described with specific reference to particular embodiments thereof, it is not to be so limited, since changes and alterations therein may be made which are within the full intended scope of this invention as defined by the appended claims.

What is claimed is:

1. A process for stabilizing a vapor degreasing composition which consists essentially of maintaining dissolved in perchloroethylene a stabilizing amount of a chemical component selected from the group consisting of (1) epibromohydrin and (2) epibromohydrin and allyl glycidyl ether.

2. The process of Claim 1 wherein from about 0.001 to about 2 percent by weight of the component is present.

3. The process of Claim 1 wherein the component is (1) epibromohydrin.

4. The process of Claim 1 wherein the component is (2) epibromohydrin and allyl glycidyl ether.

5. A process for stabilizing a vapor degreasing composition which consists essentially of maintaining dissolved in perchloroethylene a stabilizing amount of N-ethyl morpholine and a chemical component selected from the group consisting of (1) epibromohydrin and (2) epibromohydrin and allyl glycidyl ether.

6. A stabilized composition for vapor degreasing consisting essentially of perchloroethylene containing a stabilizing amount of a component selected from the group consisting of (1) epibromohydrin and (2) epibromohydrin and allyl glycidyl ether.

7. The composition of Claim 6 wherein from about 0.001 to about 2 percent by weight of the component is present.

8. The composition of Claim 6 wherein the component is (1) epibromohydrin.

9. The composition of Claim 6 wherein the component is (2) epibromohydrin and allyl glycidyl ether.

10. A stabilized composition for vapor degreasing consisting essentially of perchloroethylene containing a stabilizing amount of N-ethyl morpholine and a chemical component selected from the group consisting of (1) epi-

TABLE I

[Evaporation tests with perchloroethylene samples containing 75 p.p.m. N-methyl morpholine, 5 p.p.m. of p-tertiary amylphenol and the indicated quantity of epoxide]

| Sample No. | Epoxide [a] | Epoxide (p.p.m.) initial | Percent sample evaporated | Acid acceptance as percent NaOH |
|---|---|---|---|---|
| 1 | EPH | 3,500 | 0 | 0.152 |
|   |     |       | 25 | 0.024 |
| 2 | EBH | 5,200 | 0 | 0.152 |
|   |     |       | 25 | 0.114 |
| 3 | EBH | 2,600 | 0 | 0.152 |
|   | AGE | 2,160 | 25 | 0.095 |
| 4 | EPH | 1,750 | 0 | 0.152 |
|   | AGE | 2,160 | 25 | 0.079 |

[a] EPH is epichlorohydrin; EBH is epibromohydrin; AGE is allyl glycidyl ether.

TABLE II

[Evaporation and stability tests with perchloroethylene samples containing 75 p.p.m. of N-methyl morpholine, 5 p.p.m. of p-tertiary amylphenol and the indicated quantity of epoxide]

| | | | Evaporation test | | | | | 48 hour stability test on steel | |
|---|---|---|---|---|---|---|---|---|---|
| | | Epoxide (p.p.m.) initial | Mole percent epoxide | | Acid acceptance as percent NaOH | | Percent sample evaporated | | Acid as percent HCl |
| Sample No. | Epoxide [a] | | Initial | Final | Initial | Final | | Mg. loss | |
| 5 | EPH | 3,500 | 0.632 | 0.048 | 0.152 | 0.012 | 26.5 | 12.3 | 0.234 |
| 6 | EPH | 1,170 | 0.208 | 0.033 | | | | | |
|   | EBH | 1,740 | 0.208 | 0.129 | | | | | |
|   | AGE | 1,450 | 0.208 | 0.290 | | | | | |
| Total | | 4,360 | 0.624 | 0.452 | 0.152 | 0.110 | 28.4 | 4.9 | 0.010 |

[a] EPH is epichlorohydrin; EBH is epibromohydrin; AGE is allyl glycidyl ether.

TABLE III

[Evaporation and stability tests with perchloroethylene sample containing 25 p.p.m. of N-methyl morpholine, 50 p.p.m. of p-tertiary amylphenol, 1,500 p.p.m. of epichlorohydrin, 900 p.p.m. of epibromohydrin, 470 p.p.m. of allyl glycidyl ether, 150 p.p.m. N-methyl pyrrole and 100 p.p.m. of N-ethyl morpholine]

| | | | Evaporation test | | | | | 72 hour stability test on steel | |
|---|---|---|---|---|---|---|---|---|---|
| | | Epoxide (p.p.m.) initial | Mole percent epoxide | | Acid acceptance as percent NaOH | | Percent sample evaporated | | Alk [b] as percent NaOH |
| Sample No. | Epoxide [a] | | Initial | Final | Initial | Final | | Mg. loss | |
| 7 | EPH | 1,500 | 0.267 | 0.043 | | | | | |
|   | EBH | 900 | 0.107 | 0.054 | | | | | |
|   | AGE | 470 | 0.068 | 0.088 | | | | | |
| Total | | 2,870 | 0.442 | 0.185 | 0.108 | 0.045 | 25.9 | 63 | 0.0024 |

[a] EPH is epichlorohydrin; EBH is epibromohydrin; AGE is allyl glycidyl ether.
[b] Alk is alkalinity.